Dec. 22, 1931. H. N. WAYNE ET AL 1,837,510
SHOCK ABSORBER
Filed Nov. 4, 1929 4 Sheets-Sheet 3
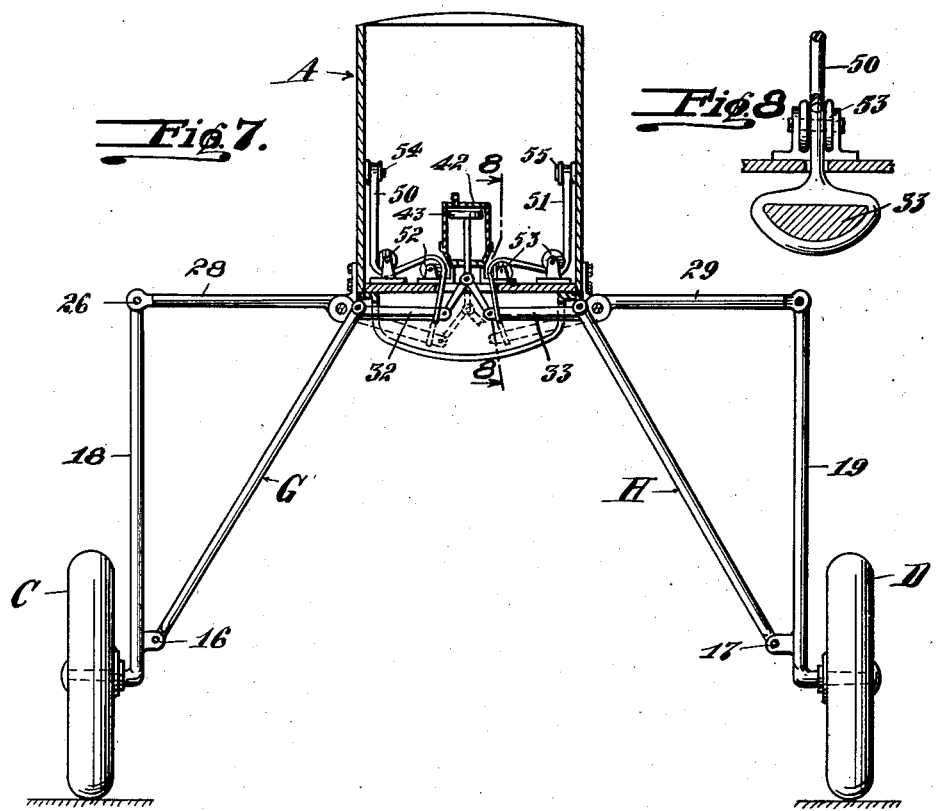
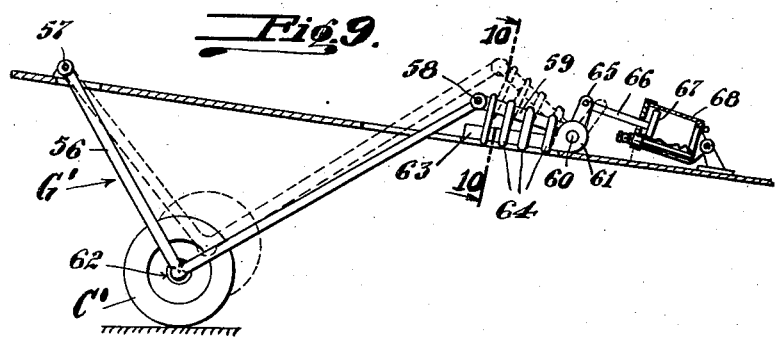
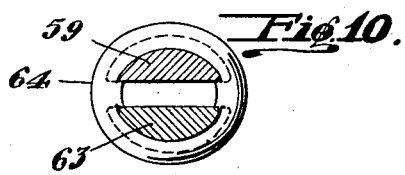
Inventor
HERBERT N. WAYNE
EARL B. COX
By R. S. Berry
Atty.

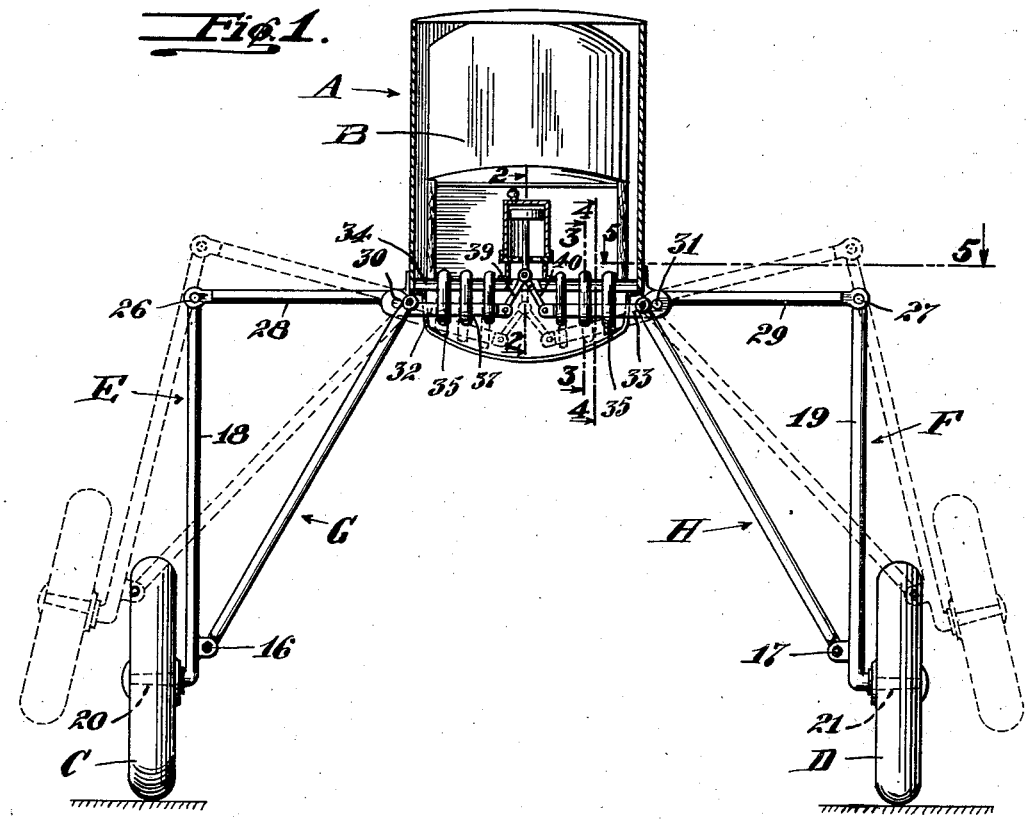
Fig. 1.
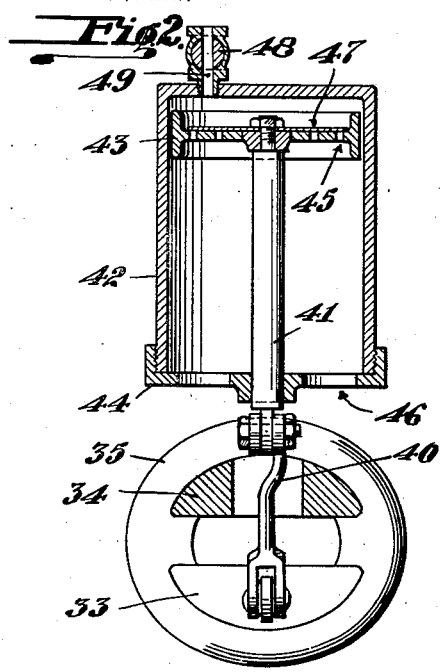
Fig. 2.
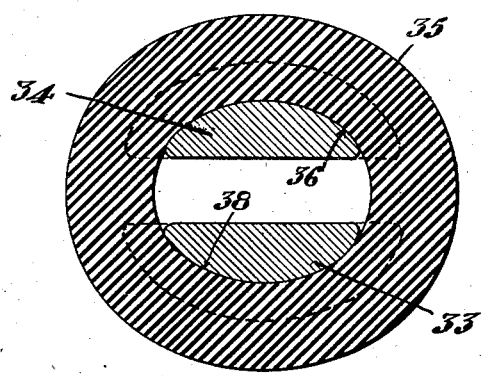
Fig. 3.
Inventor
HERBERT N. WAYNE
EARL B. COX
By
Atty.

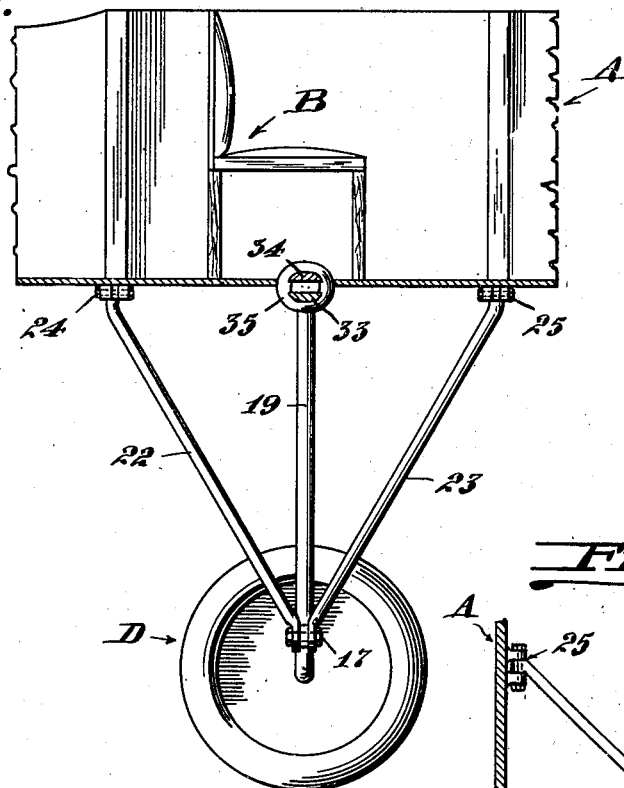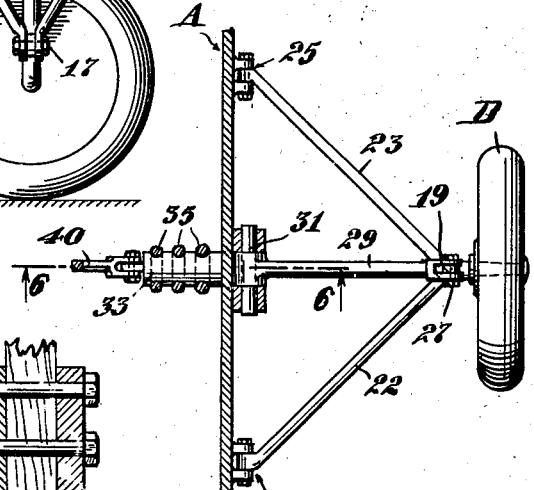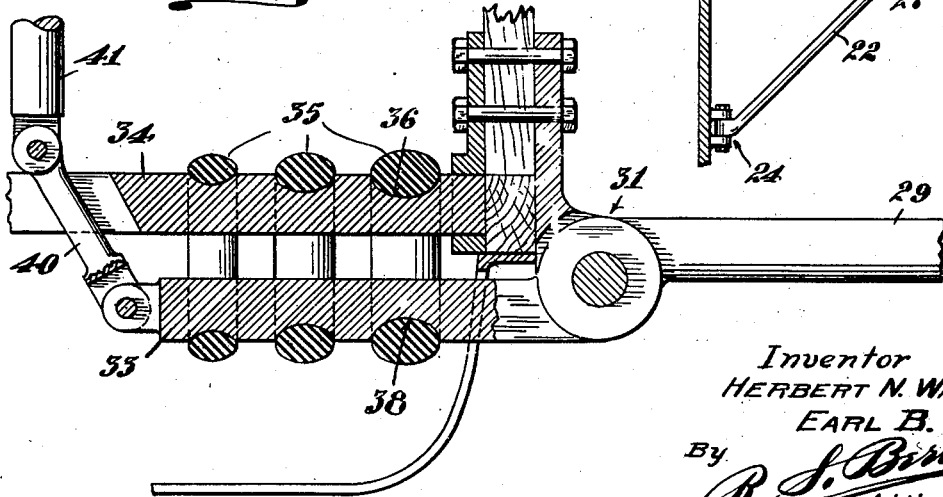

Dec. 22, 1931.  H. N. WAYNE ET AL  1,837,510
SHOCK ABSORBER
Filed Nov. 4, 1929   4 Sheets-Sheet 4
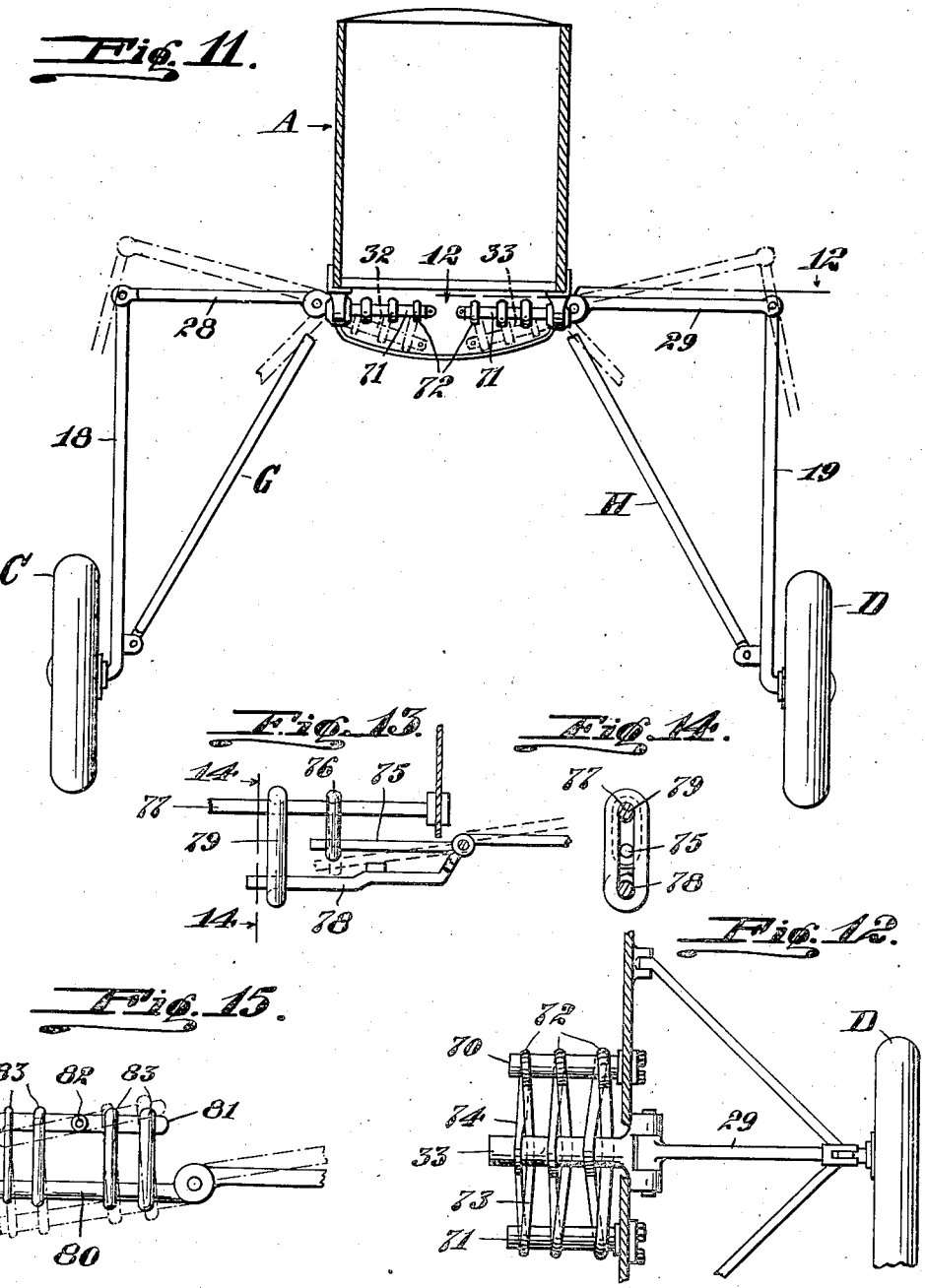
Inventor
HERBERT N. WAYNE
EARL B. COX
By R. S. Berry
Att'y.

Patented Dec. 22, 1931

1,837,510

UNITED STATES PATENT OFFICE

HERBERT N. WAYNE, OF SANTA MONICA, AND EARL B. COX, OF LOS ANGELES, CALIFORNIA

SHOCK ABSORBER

Application filed November 4, 1929. Serial No. 404,853.

This invention relates to a vehicle shock absorber and more particularly pertains to a shock absorbing landing gear for aircraft.

An object of the invention is to provide a vehicle shock absorber of the type embodying rubber bands which are employed in place of metallic springs to cushion and take up the shocks of abrupt encounters with the earth, in which a plurality of resilient bands are so formed and arranged as to cooperate with each other in absorbing heavy shocks as when the vehicle landing gear is subjected to sudden impacts such as in landing of aircraft, and will also absorb the lighter shocks imparted to the running gear while traversing the ground.

Another object is to provide an effective means for cushioning the rebound of the landing gear under the urge of the rubber bands.

Another object is to provide a shock absorber of the above character which is compact and in which the parts are so arranged that they may be readily applied to aircraft in such manner as not to offer wind resistance.

Another object is to provide an aeroplane landing gear and associated shock absorbers of simple construction and embodying few parts which may be readily assembled and are adapted to be easily removed and replaced, and in which the shock absorbing parts are highly durable, not liable to get out of order and capable of being constructed to possess a high factor of safety.

A further object is to provide a shock absorber of the rubber-band type in which a plurality of expansible rubber elements of different resistances to elongation are so connected to a pivoted arm as to yieldably oppose swinging movement of said arm in one direction with progressively increasing resistances as the arm swings in opposition thereto.

With the foregoing objects in view, together with such other objects and advantages as may subsequently appear, the invention resides in the parts and in the combination, construction and arrangement of parts hereinafter described and claimed and illustrated by way of example in the accompanying drawings, in which:—

Fig. 1 is a view in front elevation showing the invention as applied to an aeroplane;

Fig. 2 is an enlarged detail in section as seen on the line 2—2 of Fig. 1;

Fig. 3 is a detail in section as seen on the line 3—3 of Fig. 1;

Fig. 4 is a view in section and elevation as seen on the line 4—4 of Fig. 1;

Fig. 5 is a plan view as seen on the line 5—5 of Fig. 1;

Fig. 6 is an enlarged detail in section as seen on the line 6—6 of Fig. 5;

Fig. 7 is a view in front elevation illustrating a modified form of the invention;

Fig. 8 is a detail in section taken on the line 8—8 of Fig. 7;

Fig. 9 is a view in side elevation illustrating another modified form of the invention;

Fig. 10 is a view in section and elevation as seen on the line 10—10 of Fig. 9;

Fig. 11 is a view in section and elevation illustrating another modification of the invention;

Fig. 12 is a detail in horizontal section taken on the line 12—12 of Fig. 11;

Fig. 13 is a detail in elevation illustrating another modification of the invention;

Fig. 14 is a view in section and elevation as seen on the line 14—14 of Fig. 13;

Fig. 15 is a detail in elevation illustrating a further modified form of the invention.

In Figures 1 to 6 inclusive showing a preferred embodiment of the invention as applied to an aeroplane, A indicates generally a portion of an aeroplane body or fuselage here shown as being the cockpit portion thereof fitted with the usual seat B; and C and D designate the wheels of the aeroplane landing gear. In carrying out our invention the wheels C and D are carried on complementary depending frame structures E and F here shown as embodying V-hangers G and H respectively hingedly connected to the aeroplane body or fuselage in spaced relation to each other; the hangers extending downwardly at diverging inclinations and having their lower apex portions connected by pivot pins 16 and 17 to the lower portions of upright bars 18 and 19, the lower ends of which bars are fitted with spindles 20 and 21 on which the wheels C and D are revolubly mounted. The V-hangers G and H comprise side members 22 and 23, the upper ends of which are connected to hinges 24 and 25 attached to the aeroplane which hinges constitute the pivotal mountings of the hangers. The upper ends of the bars 18 and 19 are pivotally connected at 26 and 27 with levers 28 and 29 which preferably normally extend substantially at right angles to the bars 18 and 19 and are fulcrumed on pivots 30 and 31 arranged substantially intermediate the hinges 24 and 25, the pivots 30 and 31 being suitably mounted on the aeroplane body or fuselage. The levers 28 and 29 each include arms 32 and 33 constituting the inner end portions thereof which extend toward each other and terminate in spaced relation equidistant from their fulcrum points. The outer end portions of the levers 28 and 29 correspond in length, as do the bars 18 and 19 and the hangers G and H. The frame structures E and F thus each comprise in effect a triangular arrangement of links including the hangers, upright bars and the outer end portions of the levers.

Extending above the arms 32 and 33 of the levers 28 and 29 and spaced therefrom is a member relatively to which the lever is movable and here shown as comprising bar 34 rigidly affixed to the aeroplane body or fuselage, and collectively encircling the bar 34 and the lever arms 32 and 33 is one or more rubber bands 35; a series of three of such bands being here shown as provided for each lever arm, which number, however, may be increased or diminished as occasion may require. The rubber bands 35 are preferably formed of elliptic cross-section and have their inner peripheries seated in channels 36 formed in the bar 34 and in channels 37 and 38 formed in the lever arm portions 32 and 33 respectively whereby the bands 35 are held against shifting longitudinally of the bar and levers. The rubber bands 35 are designed to normally maintain the inner end portions 32 and 33 of the levers substantially in alignment.

The inner end of the lever arm portions 32 and 33 are connected by links 39 and 40 to the lower end of a piston rod 41 which extends vertically into a cylinder 42 and is affixed to a piston 43 mounted for vertical reciprocal movement in the cylinder 42; the lower end of the cylinder 42 being fitted with a cap 44 through which the piston rod 41 slidably extends.

The cylinder 42 is affixed relatively to the aeroplane body and may conveniently be placed beneath the seat B. The piston operating in the cylinder 42 serves as a means for cushioning rebound movement of the levers 28 and 29 and their associated parts; the piston 43 being designed to move downwardly in the cylinder 42 under slight resistance and to move upwardly therein under the opposition of a body of air within the cylinder above the piston. To this end, the piston 43 is formed with a series of openings 45 through which air may pass on down stroke of the piston 43 and the cap 44 at the lower end of the cylinder is formed with openings 46 through which air may be readily ejected from the cylinder on down stroke of the piston. This permits comparatively free downward movement of the piston. A flexible flap valve 47 is mounted on the upper face of the piston which normally covers the openings 45 and serves to close said openings on up stroke of the piston so as to provide an air cushion in the upper portion of the cylinder 42 when the piston 43 is in a lowered position. Adjustable means are provided for regulating the action of the air cushion which is here shown as embodying a regulating valve 48 located in a vent passage 49 leading from the upper portion of the cylinder 42; the valve 48 being adapted to be disposed to vary the size of the vent passage 49 or to close same as occasion may require. When the passage 49 is closed by the valve 48 the maximum resistance to upward movement of the piston 43 is afforded, and when the passage 49 is fully open to atmosphere through the valve 48, a minimum resistance to upward movement of the piston 43 is afforded.

In the operation of the form of the invention just described, the frames E and F are rocked upwardly by shocks imposed on the wheels C and D either while traversing the ground or by impacts imparted thereto as in landing, thereby causing the inner end portions 32 and 33 of the levers 28 and 29 to move downwardly, which movement is yieldably opposed by the action of the rubber bands 35; the resistance afforded by the bands increasing as the length of downward movement of the inner end portions of the levers increases. Downward movement of the inner end portions of the levers moves the piston 43 downwardly in the cylinder 42 thereby charging the upper portion of the cylinder above the piston with a body of air which may be admitted in part through the passage 49 as well as through the opening 45 in the piston. On the impact or load imparted to the wheels C being removed or relieved, the rubber bands 35, together with gravitational force where the wheels are clear of the ground, tend to move the inner end portions 32 and 33 of the levers upwardly and to restore the frames E and F to normal The piston 53 in moving upwardly against the volume of air thereabove, within the cylinder 42, serves to cushion this rebound movement. The upper end of the cylinder 43 may be employed to limit the upward stroke of the piston 43 thereby limiting the inward swinging movement of the frames E and F. Any other suitable stop may be provided.

In the modified form of the invention illustrated in Figs. 7 and 8, in which corresponding reference characters are employed to designate corresponding parts previously described with reference to Figures 1 to 6 inclusive, the inner end portions 32 and 33 of the levers 28 and 29 are engaged with elastic strips 50 and 51 formed of rubber or rubber composition which strips pass over pairs of direction rollers 52 and 53 and are affixed at their upper end portions at 54 and 55 to the body A of the aeroplane. In operation of this form of the invention the elastic strips 50 and 51 serve to yieldably oppose downward movement of the inner end portions 32 and 33 of the levers 28 and 29 thereby absorbing shocks imposed on the landing gear frames D and F and operating to normally restore the landing gear frames towards normal on relief of excessive impacts thereon.

In the form of the invention shown in Fig. 9, G' indicates generally a side frame member of a running or landing gear which embodies a V-frame 56, one end of which is pivoted at 57 on the aeroplane body and the other end of which is pivoted at 58 to an arm 59 on a rock shaft 60 carried in a bearing 61 on the aeroplane body. The V-frame 56 depends from the pivots 57 and 58 and carries a spindle 62 at its apex on which is mounted a wheel C'. Extending beneath the arm 59 is a fixed bar 63 and encompassing the arm 69 and bar 63 is a series of rubber rings 64 which are operable to yieldably oppose upward movement of the arm 59 relatively to the bar 63 and thereby cushion shocks imposed on the landing or running gear. The rock shaft 60 is fitted with an arm 65 connected to a piston rod 66 fitted with a piston 67 arranged in a cylinder 68 which piston and cylinder operate in a manner similar to that previously described with reference to the piston 43 and cylinder 42 shown in Fig. 2, except that in the arrangement shown in Fig. 9, the cushioning action of air on the piston 67 is effected on downward movement of the arm 59.

In the form of the invention shown in Figs. 11 and 12, in which reference characters corresponding to those of other views refer to corresponding parts, the inner end portions 32 and 33 of the levers 28 and 29 are located between a pair of stationary brackets 70 and 71 affixed to the aeroplane body, and a series of rubber bands 72 are looped over the brackets and have their intermediate portions crossed and engaged with the end portions of the levers; the upper portions 73 of the bands being passed beneath the lever end portions and the lower portions 74 of the bands being passed over the lever end portions. By this arrangement downward movement of the lever end portions will be yieldably opposed by the upper portions 73 of the bands, as indicated in dotted lines in Fig. 11, but on such rebound movement as will cause the inner end portions of the levers to move upwardly past a normal central position, the lower portions 74 of the bands passing over the lever end portions will yieldably oppose this rebound movement.

In the form of the invention shown in Figs. 13 and 14 the lever end portion 75 is engaged by one or more rubber rings 76 passing around a fixed bar 77 and operating in a manner similar to that described with reference to the form of the invention shown in Figs. 1 to 6 inclusive. The lever end portion 75, however, in this instance, is arranged over an independently movable arm 78 which is normally spaced beneath the lever end portion 75 and has its outer end projecting beyond the end of the latter into engagement with a rubber ring 79 which also engages the bar 77. The arm 78 is pivoted to swing vertically. In this form of the invention the shock-absorbing ring engaging the lever end portion 75 will serve to take up light shocks imposed on the running gear but when the running gear is subjected to such heavy shocks as to cause the lever end portion 75 to move downwardly into engagement with the arm 78 and depress the latter the rubber ring 79 will then come into action and will co-operate with the ring 76 in absorbing such heavy shocks.

In the form of the invention shown in Figure 15 the inner end portion 80 of the lever is disposed beneath a rocker arm 81 pivoted at 82 intermediate its ends, and encompassing the end portions of the rocker arm 81 and the end portion 80 of the lever is a series of rubber rings 83. By this arrangement, a compounding action of the rubber rings may be effected.

Where a series of rubber rings or bands are engaged with the inner end portions of the levers, it is desirable that the bands be progressively of decreasing cross-sectional areas with the band of largest cross-sectional area located nearest the fulcrum or pivotal point of the lever and with the band of least cross-sectional area located nearest the outer end of the lever. By this arrangement the outermost bands which are subjected to the greatest stretch will have the greater elasticity and the series of bands will collectively offer increasing resistance to outward movement of the inner end portions of the levers with increasing length of movement thereof.

While we have shown and described the invention as applied in several forms we do not limit ourselves to the exact details of construction and arrangement shown but may employ such changes and other modifications as occasion may require coming within the spirit and scope of the appended claims.

We claim:

1. In a shock absorber, a lever, a member relatively to which said lever is movable, and a plurality of extensible rubber elements offering different resistances to elongation engaging said lever and member for yieldably opposing swinging movement of said lever away from said member.

2. In a shock absorber, an arm, a pivotal mounting therefor, a member relatively to which said arm is movable, extensible resilient elements affording a connection between said arm and member and yieldably opposing movement of said arm in one direction, said extensible elements embodying a plurality of elements offering different resistances to elongation; the element offering greatest resistance to elongation being disposed nearest the pivotal mounting of said arm and the elements offering least resistance to elongation being arranged more remote from said pivotal mounting.

3. In a shock absorber, an arm, a pivot therefor, a member relatively to which said arm is movable, extensible resilient means connecting said arm and member having parts of decreasing resistance to elongation arranged progressively from the inner portion of said arm toward the outer portion thereof, and means for cushioning recoil action of said means.

HERBERT N. WAYNE.
EARL B. COX.